United States Patent [19]

Adams et al.

[11] Patent Number: 4,793,959

[45] Date of Patent: Dec. 27, 1988

[54] PROCESS FOR STAMPING A DETERGENT BAR

[75] Inventors: Michael J. Adams; Brian Edmondson, both of Cheshire, England

[73] Assignee: Lever Brothers Company, New York, N.Y.

[21] Appl. No.: 147,397

[22] Filed: Jan. 25, 1988

[30] Foreign Application Priority Data

Jan. 26, 1987 [GB] United Kingdom ................. 8701635

[51] Int. Cl.⁴ ............................................. B29C 59/02

[52] U.S. Cl. .................................... 264/320; 264/293; 264/323; 264/325; 264/337; 264/338; 425/394; 425/395; 425/DIG. 44

[58] Field of Search ............... 264/293, 320, 323, 325, 264/337, 338, 219, 225; 425/394, 395, DIG. 44

[56] References Cited

U.S. PATENT DOCUMENTS

| | | | |
|---|---|---|---|
| 2,965,946 | 12/1960 | Sweet et al. | 264/337 |
| 3,094,758 | 6/1963 | Downie | 425/394 |
| 3,241,208 | 3/1966 | Sweet et al. | 264/337 |
| 3,242,247 | 3/1966 | Watson | 425/470 |
| 3,270,110 | 8/1966 | Downie et al. | 264/219 |
| 3,408,436 | 10/1968 | Cubitt | 264/225 |

FOREIGN PATENT DOCUMENTS 831158 3/1960 United Kingdom .

*Primary Examiner*—James Lowe

*Attorney, Agent, or Firm*—James J. Farrell

[57] ABSTRACT

Detergent bars (soap or non-soap) are stamped or imprinted using a die or dies having a modulus of elasticity in the range $5\times10^5$ to $1\times10^7 Nm^{-2}$. This gives reduced adhesion of detergent to die, reduced die-blocking and consequently reduced marring of bars. Preferably each such die has a facing layer of elastomer so as to achieve the desired low modulus of elasticity which preferably is distinctly less than that of the detergent.

10 Claims, 5 Drawing Sheets

PROCESS FOR STAMPING A DETERGENT BAR

Figure 1:
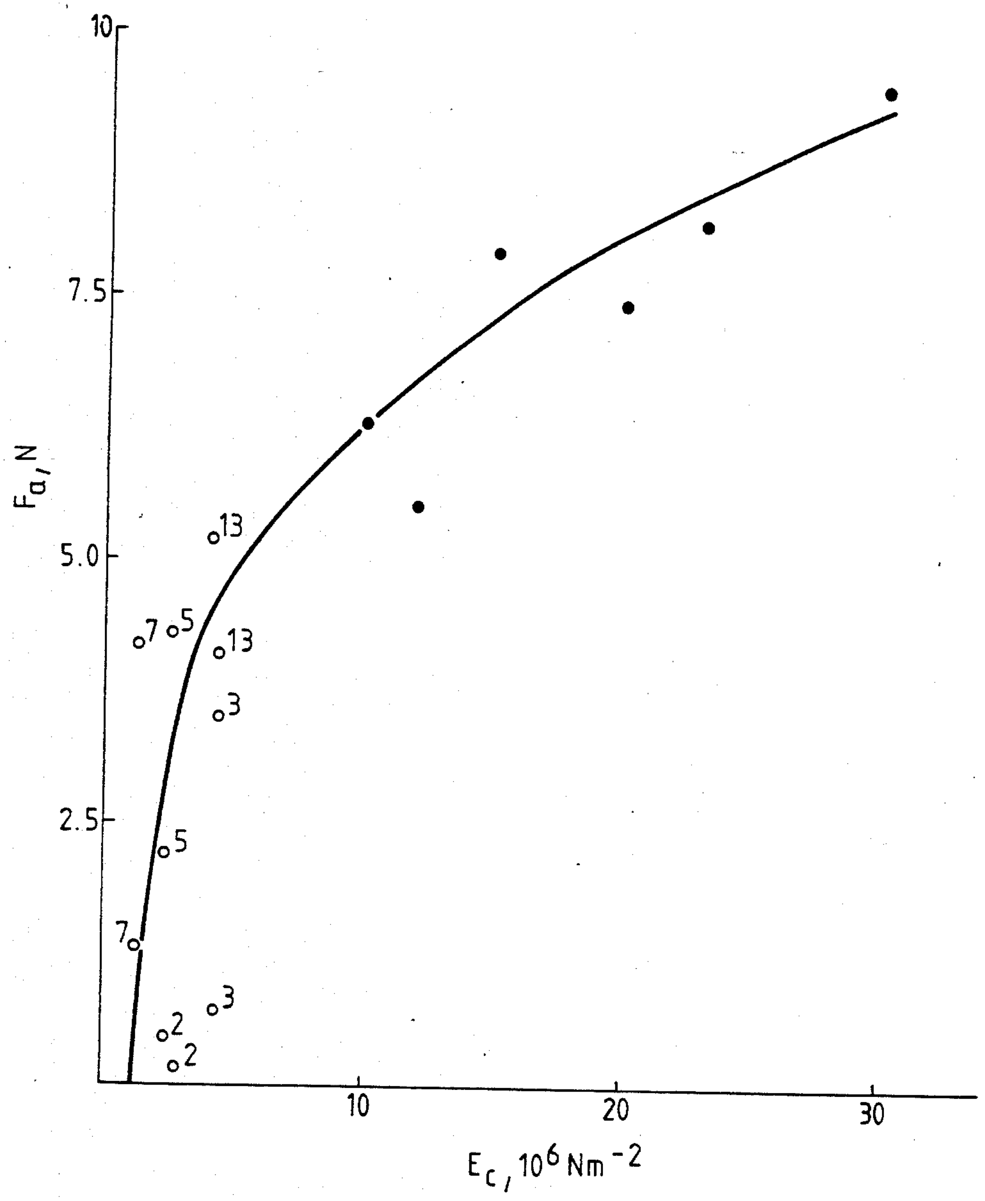

The present invention relates to a process for stamping a detergent bar, to an apparatus for stamping a detergent bar and to a detergent bar so produced.

By "detergent bar" we mean a tablet, cake or bar comprising substantially soap, substantially a synthetic detergent or mixture of soap and synthetic detergent, in each case in optional admixture with one or more additives, e.g. conventional additives used in detergent bars.

Stamping of such bars is performed to give each bar a uniform shape and a smooth glossy surface. Die stamping machines in current use include "pin die" shape machines in which a pair of opposing die members actually meet during the compaction step and a "box die" machine in which a pair of opposing die members stamp a bar held within a throughopening in a box frame but do not meet during compaction, the peripheral face of the bar being restricted by the box frame.

Stamping is also performed to imprint a design such as a logo or trade mark onto an area of the surface of a bar.

With all of the abovementioned stamping operations, problems can be encountered with respect to poor surface finish. This problem is frequently attributable to amounts of residual detergent being left in die members which increase in size with continued use of the die until a visible imperfection is left in the surface of subsequent bars. The problem is traditionally known as die-blocking.

GB No. 746 769 (Colgate-Palmolive Company) describes, it is claimed for the first time, the use of plastic material for the working face of a die member for pressing detergent material. Detergent bars so produced are said to possess a smoother finish and higher sheen than bars produced with metal dies. The die set described comprising a die box and a pair of companion die members are made of plastic materials which comprise polymers having a modulus of elasticity between $5\times10^4$ and $5\times10^6$, preferably between $2\times10^5$ and $8\times10^5$ pounds per square inch. A wide range of examples of suitable plastic materials are given. In use lubricant is said generally to be necessary to prevent pieces of detergent from adhering to and building up on the dies and marring the surfaces of subsequently pressed cakes.

U.S. Pat. No. 2,965,946 (Colgate-Palmolive Company) describes the use of a particular die box and companion die members made of organic plastic material one of whose intended aims is to reduce marring of detergent cakes on pressing due to adherence of the cake to the die. The plastic chosen should be of sufficient strength to press out the detergent being processed and flexible enough to expand against the die box interior during pressing so as to prevent flashing of the detergent. The plastic must be sufficiently resilient to return quickly to its initial shape when the pressing force is released. The modulus of elasticity is quoted as lying in the range of $5\times10^4$ to $5\times10^6$ pounds per square inch, or alternatively being lower, in the region of $1.9\times10^4$ pounds per square inch. A wide variety of suitable plastics material is given. A lubricating material e.g. mineral oil, carbitol, acetic acid, glycerine, salt solutions, pulverised solids etc. may be used.

U.S. Pat. No. 3,094,758 and U.S. Pat. No. 3,270,110 (Colgate-Palmolive Company) relate respectively to an apparatus for pressing detergents into bars or cake and a method of making a precision moulded detergent press die member. In each case the press die member described is partly of synthetic polymeric organic plastic. Each die member has embedded therein a comparatively rigid member so located that a pressing force applied to the die will cause it to press detergent material without objectionable distortion of the pressing face of the die, but will allow the peripheral edge of the die to expand to the die box. A wide range of plastics materials are suggested. The modulus of elasticity is quoted as being less than $5\times10^4$ pounds per square inch, preferably less than $3.5\times10^4$ pounds per square inch, but no lower limit or significantly lower figure is given.

U.S. Pat. No. 3,242,247 (Colgate-Palmolive Company) relates to a plastic die member for pressing detergent blanks into tablet form having a pressing face with offset embossed or recessed reverse lettering, ornamentation or other indicia with fibrous material embedded in the plastic and adjacent to the lettering etc. The embedded fibres cause the embossed and/or recessed portions to resist chipping and breakage. A wide range of plastic materials are suggested. The modulus of elasticity is again quoted as $5\times10^4$ to $5\times10^6$ pounds per square inch.

Thus, the lowest modulus of elasticity quoted in the above documents is $1.9\times10^4$ pounds per square inch which is equal to $1.3\times10^8$ Newtons per square metre ($Nm^{-2}$).

According to one aspect of the present invention there is provided a process for stamping a detergent bar including moving at least one die member relatively towards the bar so as to contact the bar, in which process the die member, or each of a plurality of die members has a total modulus of elasticity within the range of $10^5$ to $5\times10^7$ $Nm^{-2}$.

By means of the present process we have found that die-blocking can be reduced. In particular we have found that die-blocking can be attributed to the difference in elastic moduli between the bar and the die members. By means of the present process we believe less shear stress is imparted to the bar during separation of the bar and die members than by use of traditional metal die members and hence the tendency for die-blocking is reduced.

The process of this invention is applicable to any of the stamping operations mentioned initially. It may thus be employed for stamping a design onto an area of a bar, or the invention may be used in a process which entails locating a detergent bar between a pair of opposing die members and stamping the bar by moving the die members relatively towards each other, so as to contact the bar which is located between the die members.

Such a pair of die members may be pin dies or box dies. The use of pin dies is particularly preferred as it produces a detergent bar whose shape is preferred and held in high esteem by consumers. When there is more than one die member it is suitable for the modulus of elasticity of each die member to be substantially the same.

Preferably the total modulus of elasticity of the die member or each of a plurality of die members is within the range $5\times10^5$ to $10^7$ $Nm^{-2}$. More preferably the total modulus of the or each die member is approximately $10^6$ $Nm^{-2}$.

Throughout the present specification the "total modulus of elasticity" of each die member refers to that measured by compressing the surface of the die member which in use contacts the bar.

It is strongly preferred that the total modulus of elasticity of the or each die member is less than the modulus of elasticity of the detergent bar being stamped. We have found that the elastic modulus of many types of detergent bars falls within the range of $10^6$ to $10^8$ $Nm^{-2}$. Usually the detergent bar has a modulus of elasticity of approximately $10^7$ $Nm^{-2}$. Preferably the total modulus of elasticity of the or each die member is at least 5% less than the modulus of elasticity of the detergent bar being stamped, and more preferably it is not more than half that of the detergent bar. Preferably the total modulus of elasticity of the or each die member is up to 15 times less than the modulus of elasticity of the detergent bar being stamped. Accordingly the total modulus of elasticity of the or each die member preferably lies in the range from 1/15 to 95/100 of the modules of elasticity of the detergent bar.

We have found that when the total modulus of elasticity of the die member(s) is substantially less than that of the detergent bar being stamped, the adhesive force between the bar and the die(s) falls markedly. It is desirable to minimise this adhesive force.

Preferably each die member comprises a non-elastomeric part and an elastomeric part, the elastomeric part being attached to the non-elastomeric part and being arranged to contact the bar to the exclusion of the non-elastomeric part. The elastomeric part can for example comprise a layer of elastomer of at least 0.2 mm, preferably of at least 0.5 mm thickness and up to 10 mm, preferably up to 5 mm thick. Alternatively the elastomeric part can comprise a substantial part of each die member.

In order that the die member(s) should have a total modulus of elasticity less than that of the detergent bar being stamped, as is preferred, it may be necessary to choose an elastomer of suitable modulus, and/or employ a thickness of elastomer which is in the upper part of the range mentioned above, for example 3 to 8 mm.

The non-elastomeric part of each die member is suitaly metallic or made of any other suitable rigid material. The elastomeric part of each die member can be made from any suitable elastomer. Numerous types of elastomer are available, including thermoplastic, chemically-cured thermosetting and heat-cured thermosetting types. We presently prefer elastomers selected from natural rubbers, silicone rubbers, polyurethanes, and butyl rubbers. Use of a heat-cured elastomer may be preferred. In compiling each die member it must be remembered that the requirement of the present invention concerning the modulus of elasticity applies to the total modulus of elasticity of the die member, not merely that of any elastomeric part present.

By means of the present process die-blocking can be reduced and hence a good quality gloss and sheen can be imparted to the bar surface. In contrast to at least some of the prior art processes, the present process can be performed without the employment of a lubricating agent in the die members.

By use of the present process a wide range of detergent bars comprising soap or synthetic detergent or a mixture of soap and synthetic detergent can be successfully stamped. The process can be applied to high speed automatic stamping lines. The process can be suitable for application to soft tacky soap bars which traditionally have proved difficult to stamp successfully. Examples of such bars include transparent soap bars, translucent soap bars and soap bars having a reduced fatty matter content for instance fatty matter content in the range 63 to 78wt % with respect to the total bar weight.

According to another aspect of the present invention there is provided an apparatus for stamping a detergent bar comprising at least one die member arranged to move, in use, relatively towards and stamp a detergent bar, wherein the or each die member is such that it has a total modulus of elasticity within the range $10^5$ to $5\times10^7$ $Nm^{-2}$.

Preferred features of the present apparatus relating to the modulus of elasticity and composition of the die member, or each of a plurality of die members, are those mentioned above with regard to the present process.

It is to be understood that the present invention extends to detergent bars produced by the present process and/or by means of the present apparatus. The present process can be carried out by means of the present apparatus.

Embodiments of the present invention will now be described by way of example only with reference to the accompanying figures; wherein:

FIGS. 1 to 5 are plots of adhesive force ($F_a$) against a composite elastic modulus ($E_c$) for Examples 1 to 5 respectively.

EXAMPLES 1-6

To illustrate the present process experiments were performed using a modified Instron Tensiometer. The modification comprised attaching a cylindrical punch having a flat end surface to the Instron Tensiometer. The arrangement was such that the punch moved downwardly so that its flat end surface contacted an area of a piece of firmly fixed detergent bar. In each experiment the temperature of the punch was maintained at 20° C., the displacement velocity of punch was set at a constant 20 mm/min and the indentation depth into the detergent bar was selected as 3 mm. The type of detergent bar was varied and for each detergent bar tested at least two different types of punch having different moduli of elasticity were employed. The modulus of elasticity of each type of detergent bar and of each punch were measured. For each experiment the adhesive force between the punch and the detergent bar indentation was measured and a visual assessment was made of the surface of the punched indentation in the detergent bar.

The visual assessment of the bar surface was performed with respect to the following scale:

1: very smooth
2: smooth
3: relatively smooth
4: relatively rough
5: rough
6: very rough.

In Examples 1 to 5 below the results are presented in terms of plots of adhesive force ($F_a$) against a composite elastic modulus ($E_c$), wherein:

$$E_c = \frac{1}{\frac{1}{E_s} + \frac{1}{E_d}}$$

in which $E_s$ is the elastic modulus of the detergent bar being stamped and $E_d$ is the total elastic modulus of the punch. This presentation highlights the effect of the different types of punch employed.

Table I below lists the different punches employed and for each punch gives its measured modulus of elasticity ($E_d$) in $Nm^{-2}$. For the punches coated with a layer of polyurethane, the thickness of the coated layer is given in mm and an identifying code number is given for each punch.

TABLE I

| Punch type | Code No. | $E_d$ ($Nm^{-2}$) |
|---|---|---|
| Polyurethane coated: 1 mm | 1 | $1.2 \times 10^7$ |
| Polyurethane coated: 1 mm | 13 | $6.7 \times 10^6$ |
| Polyurethane coated: 3 mm | 3 | $6.1 \times 10^6$ |
| Polyurethane coated: 3 mm | 4 | $5.9 \times 10^6$ |
| Polyurethane coated: 3 mm | 5 | $2.9 \times 10^6$ |
| Polyurethane coated: 3 mm | 6 | $5.2 \times 10^6$ |
| Polyurethane coated: 3 mm | 7 | $1.2 \times 10^6$ |
| Polyurethane coated: 3 mm | 8 | $1.2 \times 10^6$ |
| Polyurethane coated: 3 mm | 9 | $1.2 \times 10^6$ |
| Polyurethane coated: 3 mm | 10 | $1.2 \times 10^6$ |
| Polyurethane coated: 3 mm | 11 | $1.2 \times 10^6$ |
| Polyurethane coated: 3 mm | 12 | $3.3 \times 10^6$ |
| Polyurethane coated: 3 mm | 14 | $3.0 \times 10^6$ |
| Polyurethane coated: 3 mm | 15 | $3.0 \times 10^6$ |
| Polyurethane coated: 5 mm | 16 | $4.4 \times 10^6$ |
| Polyurethane coated: 7 mm | 2 | $3.1 \times 10^6$ |
| Stainless steel | — | $2 \times 10^{11}$ |
| Perspex (polymethyl methacrylate) | — | $3 \times 10^9$ |
| Non-elastomeric polyurethane | — | $2.4 \times 10^9$ |
| Polytetrafluoroethylene | — | $6.4 \times 10^8$ |

EXAMPLE 1

A commercially available personal washing soap bar was employed comprising a mixture of tallow and coconut soap in a proportion of tallow to coconut of 60:40, 7.5 wt % free fatty acid and 9.5 wt % water. Samples of the soap bar were equilibrated at 40° C. Samples were tested by the Instron Tensiometer fitted with the stainless steel punch and a number of polyurethane coated punches. The modulus of elasticity of each sample of soap bar employed was measured and for each experiment a value of $E_c$ was calculated. The mean value for the modulus of elasticity of the soap bar samples was $2\times10^7$ $Nm^{-2}$.

The results are illustrated graphically in FIG. 1 which is a plot of the adhesive force ($F_a$) in N against the value of $E_c$ in $Nm^{-2}$ calculated for each experiment. The open circles are the results using the polyurethane coated punches and the full circles are the results using the polished stainless steel punch. The numbers adjacent the open circles are the code numbers of the polyurethane punches employed. As can be seen from FIG. 1, use of the present elastomer coated punches not only produced reduced adhesive forces compared to the use of the stainless steel punch but the plotted points associated with use of the present elastomer coated punches tend to decreasing $F_a$ with decreasing $E_c$, the spread in the points being due to the variation in $E_s$ among the different soap bar samples employed as well as the variation in $E_d$ between the punches.

Table II below includes for a representative number of experiments the values of the parameters $E_c$ and the score rating on the above scale with regard to the visual appearance of each soap sample. As can be seen, samples having acceptable scores were only achieved with the use of the present elastomer coated punch.

TABLE II

| Punch type | $E_d$ ($Nm^{-2}$) | $E_c$ ($Nm^{-2}$) | Visual Score |
|---|---|---|---|
| Polyurethane coated No. 7 | $1.2 \times 10^6$ | $1.2 \times 10^6$ | 1 |
| Polyurethane coated No. 2 | $3.1 \times 10^6$ | $2.8 \times 10^6$ | 1 |
| Polyurethane coated No. 3 | $6.1 \times 10^6$ | $4.0 \times 10^6$ | 2 |

TABLE II-continued

| Punch type | $E_d$ ($Nm^{-2}$) | $E_c$ ($Nm^{-2}$) | Visual Score |
|---|---|---|---|
| Stainless steel | $2 \times 10^{11}$ | $2.9 \times 10^7$ | 4 |

EXAMPLE 2

Experiments were performed on commercially available samples of household soap bar comprising by weight 86 parts tallow soap and 14 parts coconut soap, with a total fatty matter content of 63 wt %. The samples were maintained at 40° C. and the Instron Tensiometer was operated under the conditions given above. Five different punch types were employed having a range of $E_d$ values. The punch types employed were polyurethane coated punches, the stainless steel punch, the perspex punch, the polyurethane punch and the polytetrafluoroethylene punch. The mean value of the modulus of elasticity of the soap bar samples employed was $1\times10^7$ $Nm^{-2}$.

Figure 2:
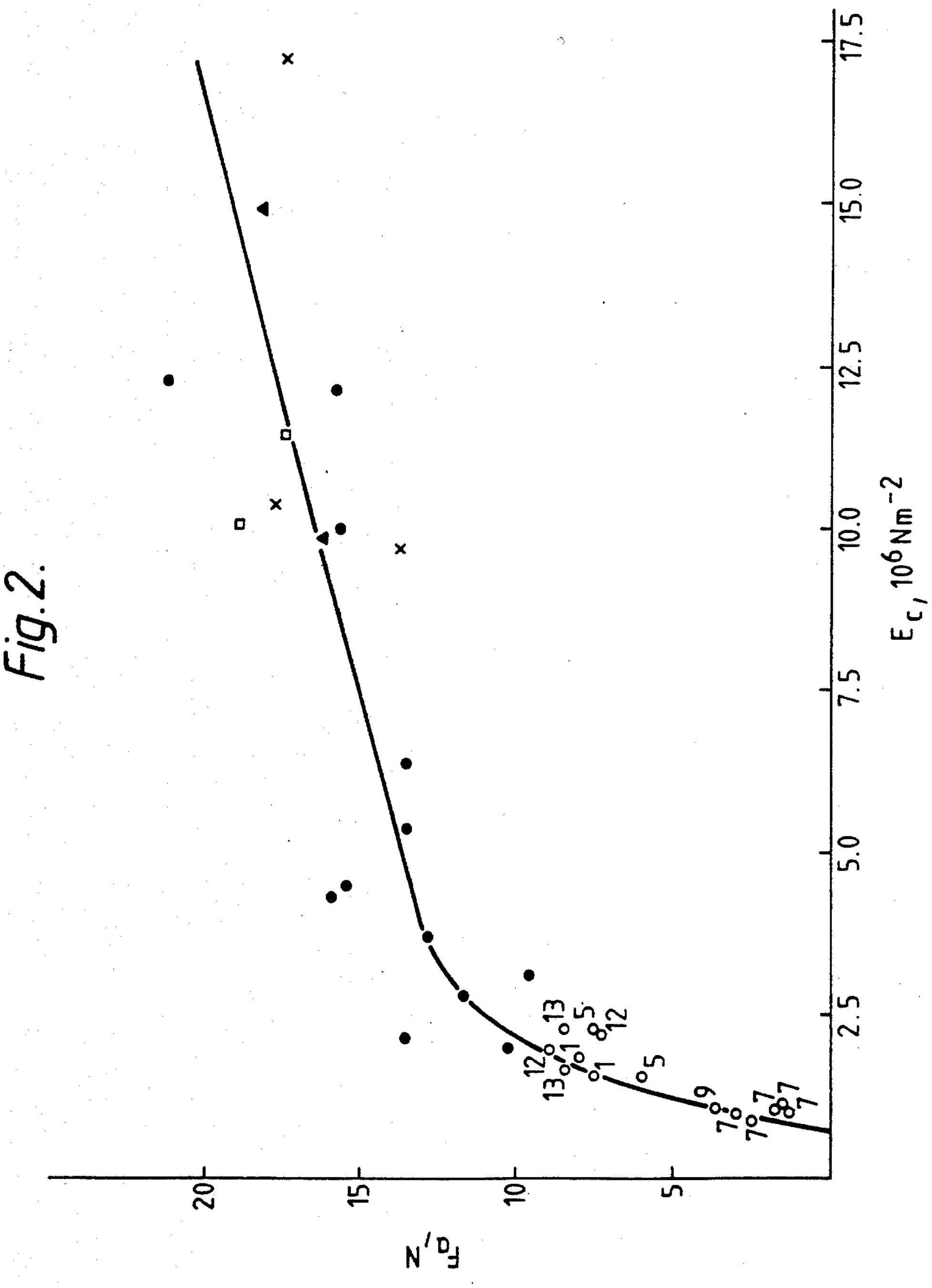

FIG. 2 illustrates the results graphically and is a plot of adhesive force ($F_a$) in N against $E_c$ in $Nm^{-2}$ for each sample. The identification of the symbols indicating which punch was employed is given in Table III below. The numbers adjacent the open circles are the code numbers given in Table I. As can be seen from FIG. 5, substantially reduced adhesive force is associated only with the present elastomer coated punch.

A representative range of samples were assessed visually and given a score according to the above scale. The results are given in Table III below. Also included in Table III is the $E_c$ value for each sample assessed and the $E_d$ value for the punch used.

TABLE III

Figure 5:
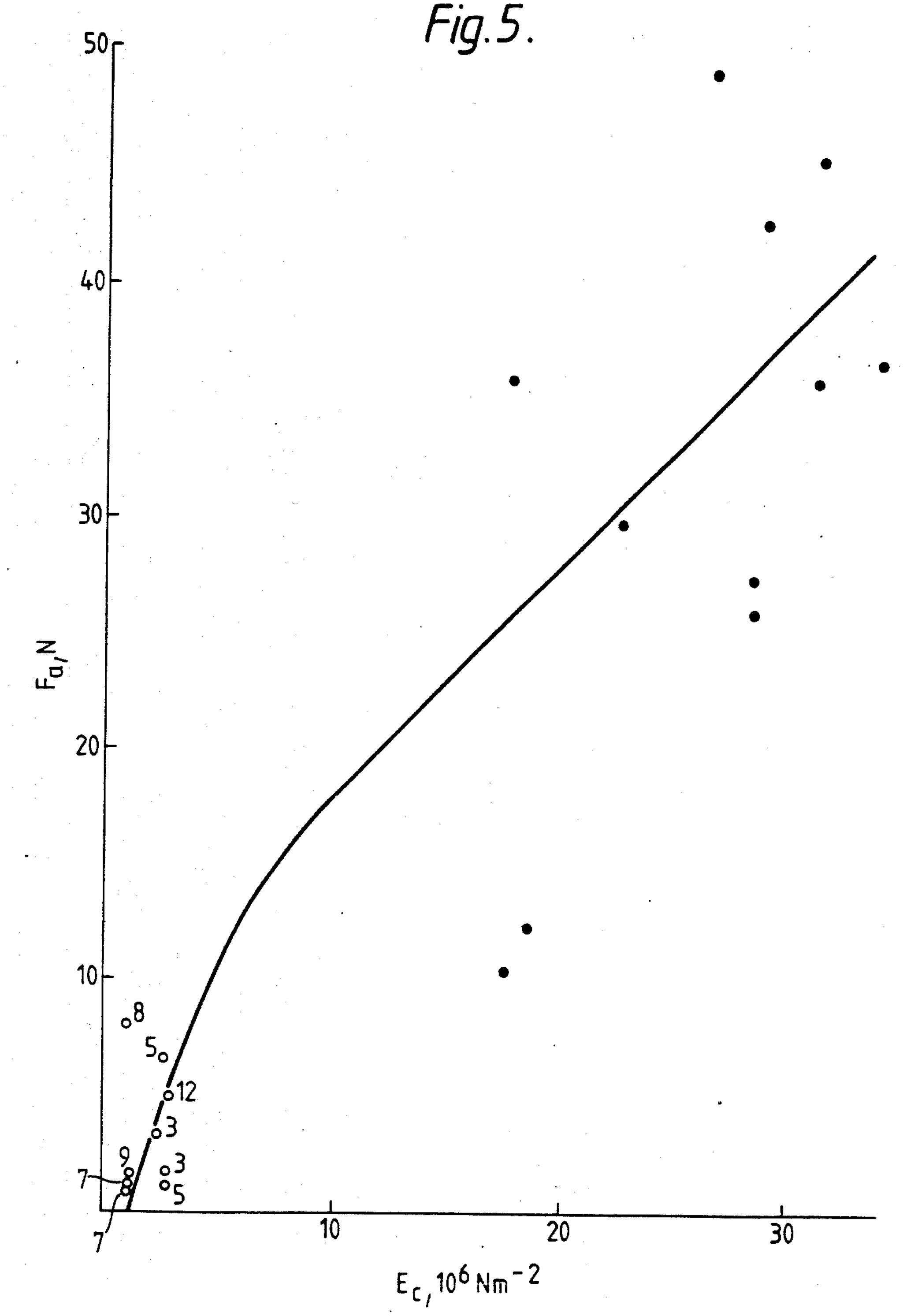

| Punch type symbol in FIG. 5) | $E_d$ ($Nm^{-2}$) | $E_c$ ($Nm^{-2}$) | Visual Score |
|---|---|---|---|
| Polyurethane coated No. 7 (○) | $1.2 \times 10^6$ | $1.0 \times 10^6$ | 2 |
| Stainless steel (●) | $2 \times 10^{11}$ | $1.2 \times 10^7$ | 6 |
| Perspex (x) | $3 \times 10^9$ | $1.0 \times 10^7$ | 6 |
| Polyurethane (Δ) | $2.4 \times 10^8$ | $9.8 \times 10^6$ | 6 |
| Polytetrafluoroethylene (□) | $6.4 \times 10^8$ | $1.0 \times 10^7$ | 5 |

EXAMPLE 3

Commercially available samples of a laundry soap bar were employed. The samples were each maintained at 40° C. and a number of experiments with some of the present elastomer coated punches and the stainless steel punch were performed. The soap bar samples had a mean modulus of elasticity of $7\times10^6$ $Nm^{-2}$.

Figure 3:
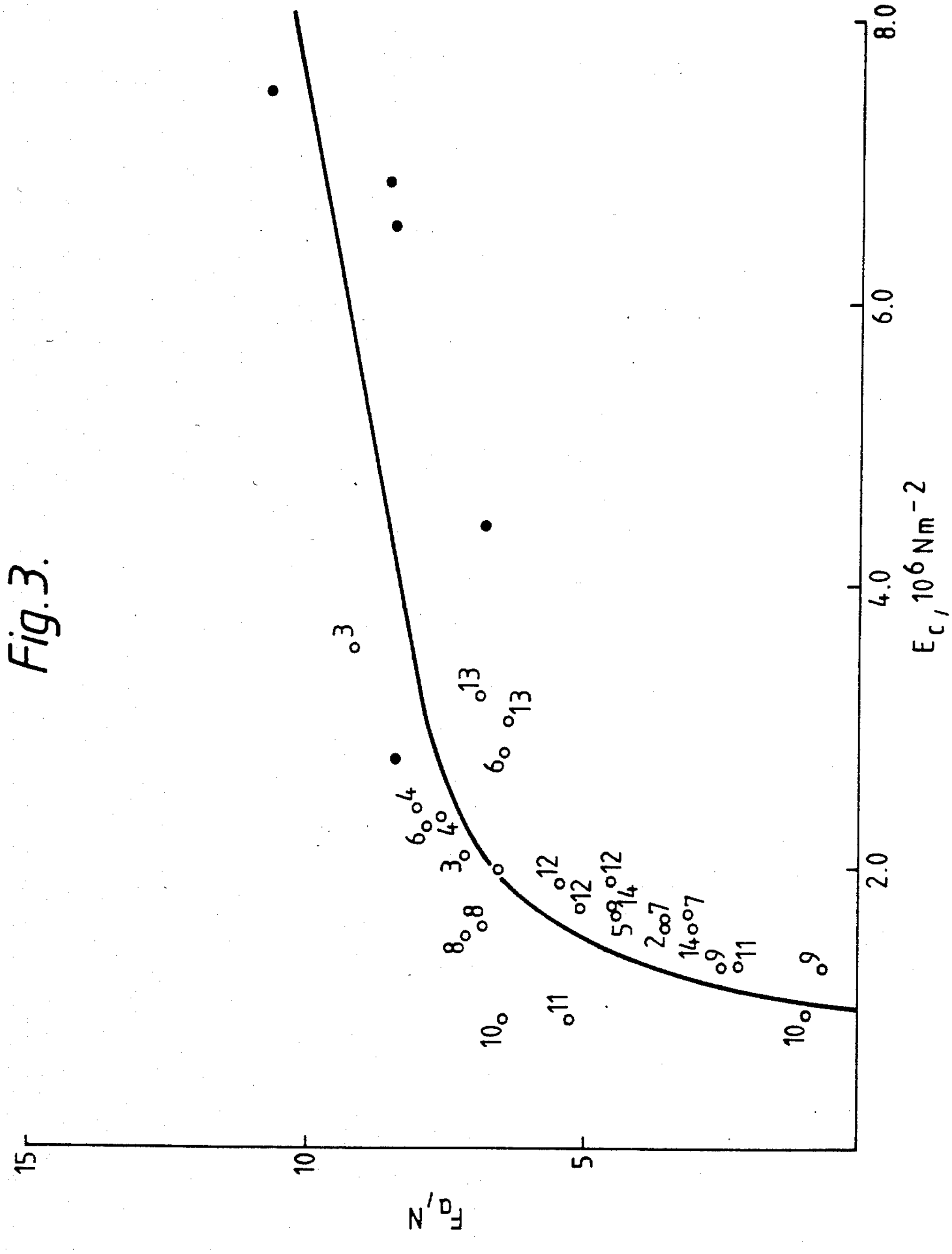
Figure 4:
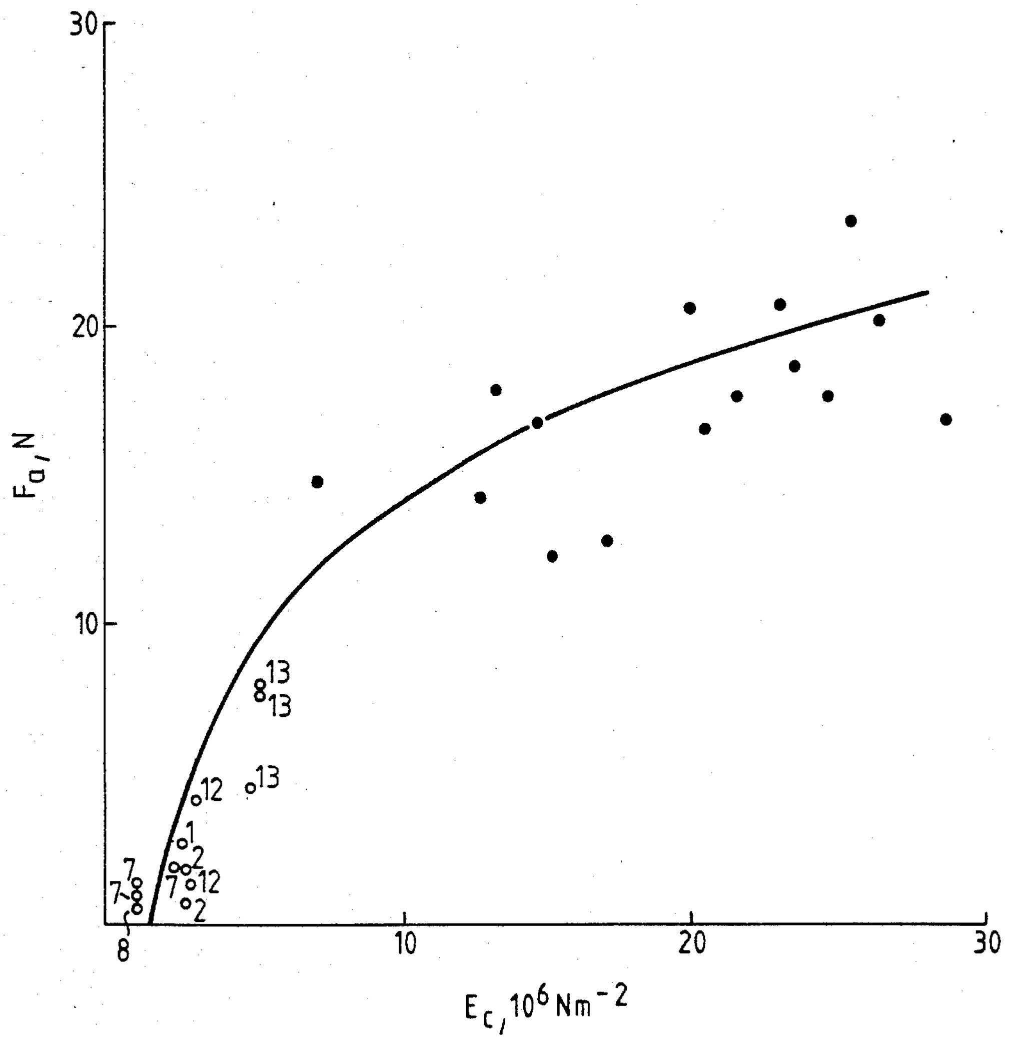

The results in terms of a plot of adhesive force ($F_a$) against $E_c$ are given in FIG. 3. The open circles in the figure relate to the elastomer coated punches and the filled circles to the stainless steel punch. The numbers adjacent the open circles are the code numbers given in Table I identifying which elastomer coated punch was employed. As can be seen from the figure, reduced adhesive force is associated with the use of the present elastomer coated punches. Two representative samples were assessed for their visual appearance according to the above score. The results are given in Table IV below. Also given in Table IV are the $E_c$ values for each sample.

TABLE IV

| Punch type | $E_d$ ($Nm^{-2}$) | $E_c$ ($Nm^{-2}$) | Visual Score |
|---|---|---|---|
| Polyurethane coated No. 9 | $1.2 \times 10^6$ | $1.1 \times 10^6$ | 2 |
| Stainless steel | $2 \times 10^{11}$ | $7.5 \times 10^6$ | 5 |

EXAMPLE 4

Experiments were performed on samples of detergent bar comprising an admixture of soap and sodium fatty acyl isethionate. The samples were each maintained at 40° C. and a number of experiments were performed using some of the present elastomer coated punches and the stainless steel punch. The results are shown as a plot of $F_a$ against $E_c$ in FIG. 4 and show that reduced adhesive forces are achieved with the elastomer coated punch. In the FIG. the filled circles relate to the stainless steel punch and the open circles to the polyurethane coated punches with the appropriate identifying code number adjacent each circle. The mean modulus of elasticity of the present detergent bar samples was $2\times10^7$ $Nm^{-2}$. Two representative samples were assessed visually and the scores are given in Table V below. The $E_c$ for each sample is also given in Table V, together with the $E_d$ value for the punch employed.

TABLE V

| Punch type | $E_d$ ($Nm^{-2}$) | $E_c$ ($Nm^{-2}$) | Visual Score |
|---|---|---|---|
| Polyurethane coated No. 8 | $1.2 \times 10^6$ | $1.1 \times 10^6$ | 2 |
| Stainless steel | $2 \times 10^{11}$ | $2.3 \times 10^7$ | 3 |

EXAMPLE 5

Experiments were performed on samples of detergent bars comprising 50 wt % sodium fatty acyl isethionate, 8 wt % soap, 5 wt % sodium isethionate, 20 wt % stearic acid, 3 wt % coconut fatty acid, 5 wt % moisture and 7 wt % remainder. The samples were maintained at 40° C. and a number of experiments were performed with some of the present elastomer coated punches and the stainless steel punch. The results are shown graphically in FIG. 5 which is a plot of $F_a$ against $E_c$ and shows that reduced adhesive forces were achieved with the elastomer coated punches. In the figure the filled circles relate to the use of the stainless steel punch and the open circles, with identifying code numbers adjacent, to the use of the polyurethane coated punches. The mean modulus of elasticity of the present detergent bars was $3\times10^7$ $Nm^{-2}$.

Two representative samples were assessed visually according to the above score. The results are given in Table VI below. Also included in Table VI are the $E_c$ values.

TABLE VI

| Punch type | $E_d$ ($Nm^{-2}$) | $E_c$ ($Nm^{-2}$) | Visual score |
|---|---|---|---|
| Polyurethane coated No. 12 | $3.3 \times 10^6$ | $2.6 \times 10^6$ | 2 |
| Stainless steel | $2 \times 10^{11}$ | $2.9 \times 10^7$ | 4 |

EXAMPLE 6

A number of experiments were performed using samples of a personal washing soap bar which has the same as that for Example 1. The samples were each maintained at 40° C. and a number of experiments were performed using the present elastomer coated punches nos. 1, 14, 16 and 2 having respectively different thicknesses of polyurethane coating. The results are given in Table VII which lists $F_a$ in N and the thickness of the polyurethane layer in mm. As can be seen the value of $F_a$ decreases with increasing elastomer layer thickness. The decrease in $F_a$ thus can be correlated with decreasing modulus of elasticity of the punch.

Each of the samples was assessed for its visual appearance according to the above score. The results are also given in Table VII below, together with the $E_c$ value for each sample and the $E_d$ value for each punch employed.

TABLE VII

| Punch type | Elastomer Thickness | $E_d$ ($Nm^{-2}$) | $E_c$ ($Nm^{-2}$) | $F_a$ (N) | Visual Score |
|---|---|---|---|---|---|
| Polyurethane coated No. 1 | 1 mm | $1.2 \times 10^7$ | $7.5 \times 10^6$ | 7.0 | 3 |
| Polyurethane coated No. 14 | 3 mm | $3.0 \times 10^6$ | $2.6 \times 10^6$ | 3.0 | 1 |
| Polyurethane coated No. 16 | 5 mm | $4.4 \times 10^6$ | $3.6 \times 10^6$ | 3.5 | 2 |
| Polyurethane coated No. 2 | 7 mm | $3.1 \times 10^6$ | $2.7 \times 10^6$ | 3.0 | 1 |

(Mean modulus of elasticity of the soap bars $2 \times 10^7$ $Nm^{-2}$).

EXAMPLE 7

Elastomer coated pin dies were used to stamp bars of a soft sticky soap, which would tend to adhere strongly to metal dies, necessitating surface chilling to prevent dieblocking problems from becoming unmanagable.

Using the elastomer coated dies, satisfactory bars were produced without surface chilling and without serious die-blocking.

We claim:

1. In a process of stamping a detergent bar by moving at least one die member relatively towards the bar so as to contact the bar, the improvement wherein said at least one die member has a total modulus of elasticity within the range $10^5$ to $5\times10^7$ $Nm^{-2}$, whereby die-blocking is reduced and a good quality gloss and sheen is imparted to the surface of said bar.

2. A process according to claim 1 wherein said at least one die member has a total modulus of elasticity within the range of $5\times10^5$ to $10^7$ $Nm^{-2}$.

3. A process according to claim 1 carried out by means of a pair of opposing said die members, including locating a detergent bar between said die members and stamping the bar by moving said die members relatively towards each other so as to contact the bar therebetween.

4. A process according to claim 3 wherein the total modulus of elasticity of each said die member is substantially the same.

5. A process according to claim 1 wherein the total modulus of elasticity of said at least one die member is less than the modulus of elasticity of the detergent bar being stamped.

6. A process according to claim 5 wherein the total modulus of elasticity of said at least one die member is in the range from 1/15 to 95/100 of the modulus of elasticity of the detergent bar being stamped.

7. A process according to claim 1 wherein said at least one die member comprises a non-elastomeric part and an elastomeric part, the non-elastomeric part carrying the elastomeric part at a position to contact the bar during stamping to the exclusion of the non-elastomeric part.

8. A process according to claim 7 wherein said elastomeric part comprises a layer of an elastomer at least 0.2 mm and at most 10 mm thick.

9. A process according to claim 7 wherein said elastomeric part is made of a material selected from the group comprising natural rubbers, silicone rubbers, polyurethanes and butyl rubbers.

10. A process according to claim 1 wherein each die member susbstantially retains its shape during stamping.

* * * * *